(12) United States Patent
Kimura

(10) Patent No.: US 8,242,195 B2
(45) Date of Patent: Aug. 14, 2012

(54) GOLF BALL

(75) Inventor: Akira Kimura, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 476 days.

(21) Appl. No.: 12/533,493

(22) Filed: Jul. 31, 2009

(65) Prior Publication Data

US 2011/0028246 A1 Feb. 3, 2011

(51) Int. Cl.
*A63B 37/06* (2006.01)
*A63B 37/00* (2006.01)
*C08L 9/00* (2006.01)

(52) U.S. Cl. ........ 524/323; 524/351; 524/352; 524/349; 525/263; 525/264; 525/265; 525/274; 473/377; 473/378; 473/383; 473/384

(58) Field of Classification Search .................. None
See application file for complete search history.

(56) References Cited

U.S. PATENT DOCUMENTS

| 6,837,803 | B2 | 1/2005 | Nanba et al. | |
|---|---|---|---|---|
| 7,387,581 | B2 | 6/2008 | Higuchi et al. | |
| 7,481,722 | B2 | 1/2009 | Higuchi | |
| 7,510,488 | B2 | 3/2009 | Higuchi et al. | |
| 7,510,489 | B2 | 3/2009 | Higuchi | |
| 2006/0178231 | A1* | 8/2006 | Kasashima | 473/371 |
| 2008/0051223 | A1* | 2/2008 | Nagasawa et al. | 473/378 |
| 2008/0194357 | A1* | 8/2008 | Higuchi | 473/373 |
| 2010/0298067 | A1* | 11/2010 | Watanabe | 473/373 |

FOREIGN PATENT DOCUMENTS

| JP | 2004-121815 A | 4/2004 |
|---|---|---|
| JP | 2007-152090 A | 6/2007 |
| JP | 2008-194470 A | 8/2008 |
| JP | 2008-194473 A | 8/2008 |

* cited by examiner

*Primary Examiner* — David Buttner
(74) *Attorney, Agent, or Firm* — Sughrue Mion, PLLC

(57) ABSTRACT

The invention provides a golf ball having a core formed by vulcanizing a rubber composition and a cover composed primarily of a polyurethane material. The rubber composition of the core includes 100 parts by weight of a base rubber, from 10 to 40 parts by weight of an unsaturated carboxylic acid or a metal salt thereof, a peroxyketal (a) and a monophenol-type antioxidant (b), the weight ratio (a)/(b) of the peroxyketal to the monophenol-type antioxidant being from 5 to 50. The ball has an excellent discoloration resistance and an outstanding distance and feel on shots taken with a middle iron.

9 Claims, 2 Drawing Sheets

GOLF BALL

BACKGROUND OF THE INVENTION

The present invention relates to a golf ball having a plurality of dimples formed on a surface thereof, a core formed by vulcanizing a rubber composition, and a cover composed primarily of a polyurethane material.

Although an increase in distance on shots with a driver is an appealing feature to golfers, middle irons also have their appeal in golf play. As used herein, "middle irons" generally refers to the number five to seven irons—that is, irons capable of achieving a ball distance of about 130 to 170 yards.

It is desired that the distance traveled on shots with a middle iron be increased, and also that flight performance and other ball performance attributes, including durability to cracking on repeated impact and scuff resistance, be maintained. Recently, golf balls in which the cover material is a urethane material instead of the ionomers commonly employed until now have become conspicuous. Such urethane cover golf balls, in addition to achieving an excellent flight on driver shots, are also capable of improved controllability due to the increased spin rate on approach shots.

However, in conventional golf balls, the core, which accounts for most of the volume of the overall ball and is generally formed of a rubber composition, exerts a large influence on ball performance. Golf balls aimed at achieving synergistic effects between the core and the urethane cover include those described in, for example, JP-A 2007-152090, JP-A 2008-194470, JP-A 2008-194473 and JP-A 2004-121815.

JP-A 2007-152090 describes a two-piece solid golf ball with a urethane cover, which ball uses a core having a hardness profile limited to a Shore D value of 20 or below. However, the core cross-sectional hardness is not optimized, as a result of which the spin rate of the ball rises, shortening the distance traveled. In addition, this ball has a poor resistance to discoloration.

JP-A 2008-194470 describes a urethane cover golf ball in which the core has a relatively low surface hardness. However, in this golf ball, the cross-sectional hardness of the core is not optimized, as a result of which the spin rate of the ball rises, shortening the distance traveled. Moreover, the ball has a poor discoloration resistance.

JP-A 2008-194473 describes a golf ball having a core formed of a rubber composition which contains sulfur in the base rubber and has a high loading of unsaturated carboxylic acid or a metal salt thereof. However, this golf ball has a poor discoloration resistance.

JP-A 2004-121815 discloses a golf ball in which the base rubber contains a monophenol-type antioxidant and has a relatively small loading of organic peroxide.

SUMMARY OF THE INVENTION

An object of the present invention is to provide a golf ball with a urethane cover, which ball has an excellent discoloration resistance and, when played with a middle iron, achieves an excellent distance and has an excellent feel on impact.

The inventors have conducted extensive investigations, as a result of which they have discovered that, in a golf ball having a core and a cover, by using a core rubber composition that includes both a peroxyketal and a monophenol-type antioxidant and in which the compounding ratio between these two components is set within a specific range, there can be obtained a golf ball which has an improved discoloration resistance and which, when hit with a middle iron, travels an even greater distance than in the prior art.

Accordingly, the present invention provides the following golf balls.

[1] A golf ball comprising a core formed by vulcanizing a rubber composition and a cover composed primarily of a polyurethane material, wherein the rubber composition of the core includes 100 parts by weight of a base rubber, from 10 to 40 parts by weight of an unsaturated carboxylic acid or a metal salt thereof, a peroxyketal (a) and a monophenol-type antioxidant (b), the weight ratio (a)/(b) of the peroxyketal to the monophenol-type antioxidant being from 5 to 50.

[2] The golf ball of [1], wherein the peroxyketal is 1,1-bis(t-butylperoxy)cyclohexane and is included in an amount of from 1.5 to 3.0 parts by weight per 100 parts by weight of polybutadiene.

[3] The golf ball of [1], wherein the monophenol-type antioxidant is 2,6-di-t-butyl-4-methylphenol and is included in an amount of from 0.1 to 0.2 part by weight per 100 parts by weight of polybutadiene.

[4] The golf ball of [1], wherein the polyurethane material of the cover is a material formed by injection-molding a single resin blend composed primarily of (A) a thermoplastic polyurethane and (B) a polyisocyanate compound, in at least some portion of the polyisocyanate compound all the isocyanate groups on the molecule remain in an unreacted state.

[5] The golf ball of [1], wherein the core has a deflection when compressed under a final load of 130 kgf from an initial load of 10 kgf of from 2.0 to 6.0 mm, and the ball has a deflection when compressed under a final load of 130 kgf from an initial load of 10 kgf of from 2.2 to 5.0 mm.

[6] The golf ball of [1], wherein the ball has from 250 to 350 dimples formed on a surface thereof, which dimples are of at least five types, include from 6 to 30 small-diameter dimples with a diameter of not more than 3.0 mm, and have a dimple surface coverage (SR), defined as the sum of the surface areas on a hypothetical sphere that are circumscribed by the edges of the respective dimples as a proportion of the surface area of the hypothetical sphere, of at least 70%; and the ball, when struck, has a coefficient of lift CL at a Reynolds number of 70,000 and a spin ratio of 2,000 rpm which is at least 60% of the coefficient of lift CL at a Reynolds number of 80,000 and a spin rate of 2,000.

BRIEF DESCRIPTION OF THE DIAGRAMS

DETAILED DESCRIPTION OF THE INVENTION

Figure 1:
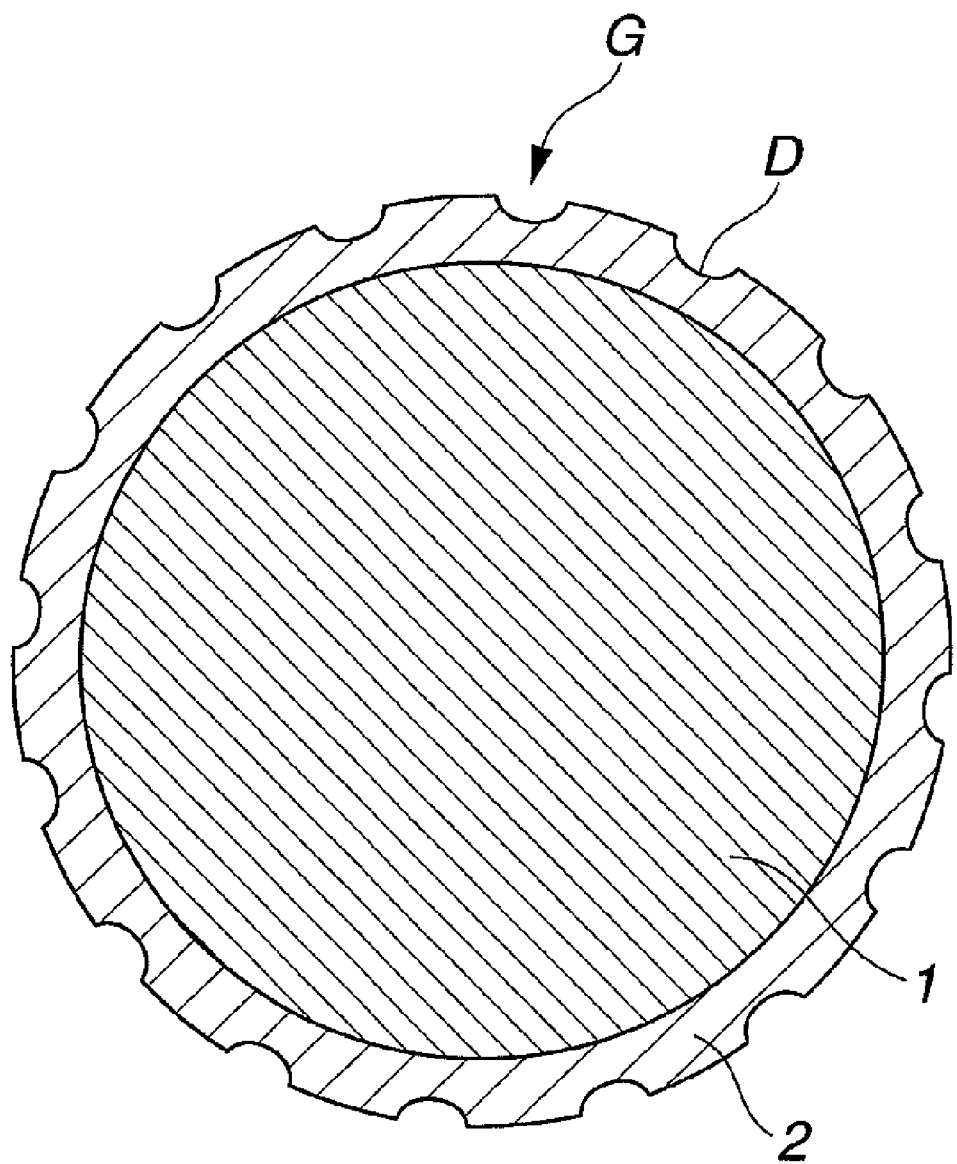
FIG. 1 is a cross-sectional view showing a golf ball according to an embodiment of the present invention.

The invention is described more fully below.

The golf ball of the invention has a core and a cover which encases the core.

The core is a hot-molded piece made from a rubber composition in which a polybutadiene serves as the base rubber.

The polybutadiene must have a cis-1,4 bond content of at least 60%, preferably at least 80%, more preferably at least 90%, and most preferably at least 95%, and a 1,2-vinyl bond content of preferably not more than 2%, more preferably not more than 1.7%, and most preferably not more than 1.5%.

Although catalysts for synthesizing polybutadienes having such properties are not subject to any specific limitation, the polybutadiene employed is preferably one synthesized using a catalyst of a group VIII element such as nickel or cobalt or a catalyst of rare-earth element such as neodymium. Specific examples of such polybutadienes available as commercial products include BR 01, BR 11 and BR 730 produced by JSR Corporation, and CB 22 and CB 24 produced by Bayer AG.

The polybutadiene must be included in the base rubber in an amount of at least 60 wt %, preferably at least 70 wt %, more preferably at least 80 wt %, and most preferably at least 90 wt %, and up to 100 wt %, preferably up to 98 wt %, and more preferably up to 95 wt %. If the polybutadiene content is inadequate, it is difficult to obtain golf balls imparted with a good rebound.

Rubbers other than the above polybutadiene may be used together and blended within a range that satisfies the objects of the invention. Illustrative examples include polybutadiene rubbers (BR), styrene-butadiene rubbers (SBR), natural rubbers, polyisoprene rubbers, and ethylene-propylene-diene rubbers (EPDM). These may be used singly or as combinations of two or more thereof.

The hot-molded piece used as the solid core is made of a rubber composition formulated from 100 parts by weight of the above base rubber and specific amounts of the following essential ingredients: an unsaturated carboxylic acid or metal salt thereof, a peroxyketal, an inorganic filler and a monophenol-type antioxidant.

Illustrative examples of the unsaturated carboxylic acid include acrylic acid, methacrylic acid, maleic acid and fumaric acid. Acrylic acid and methacrylic acid are especially preferred.

A zinc or magnesium salt of the unsaturated fatty acid, such as zinc methacrylate or zinc acrylate, may be included as the metal salt of an unsaturated carboxylic acid. The use of zinc acrylate is especially preferred.

The unsaturated carboxylic acid and/or metal salt thereof is included in an amount, per 100 parts by weight of the base rubber, of at least 10 parts by weight, preferably at least 15 parts by weight, and more preferably at least 20 parts by weight, but not more than 40 parts by weight, preferably not more than 35 parts by weight, and more preferably not more than 30 parts by weight. Too much will make the core too hard, resulting in a ball feel on impact that is difficult to endure. On the other hand, too little will result in a decline in the ball rebound.

The peroxyketal is included in an amount, per 100 parts by weight of the base rubber, of preferably from 0.5 to 5 parts by weight, more preferably from 1.0 to 4 parts by weight, and even more preferably from 1.5 to 3 parts by weight. Illustrative examples of peroxyketals include 1,1-di(t-butylperoxy)-2-methylcyclohexane, 1,1-di(t-hexylperoxy)-3,3,5-trimethylcyclohexane, 1,1-di(t-hexylperoxy)cyclohexane, 1,1-di(t-butylperoxy)cyclohexane, 2,2-di[4,4-di(t-butylperoxy)cyclohexane]propane, 2,2-di(t-butylperoxy)butane and n-butyl-4,4-di(t-butylperoxy)valerate. Specific examples of commercial peroxyketals include those available from NOF Corporation under the trade names Perhexa HC, Perhexa TMH, Perhexa C-80 (S), Perhexa C-75 (EB), Perhexa C(C), Perhexa C-40, Perhexa C-40 MB (S), Pertetra A, Perhexa V-40 (F), Perhexa 22 and Perhexa MC. The use of the above Perhexa C-40 is preferred.

A monophenol-type antioxidant is included as the antioxidant. The monophenol-type antioxidant is included in an amount, per 100 parts by weight of the base rubber, of preferably from 0.01 to 0.4 part by weight, more preferably from 0.05 to 0.3 part by weight, and even more preferably from 0.1 to 0.2 part by weight. Illustrative examples of the monophenol-type antioxidant include 2,6-di-t-butyl-4-methylphenol, 2,6-di-t-butyl-4-ethylphenol, mono(α-methylbenzyl)phenol, di(α-methylbenzyl)phenol, tri(α-methylbenzyl)phenol, 2-t-butyl-4-methoxyphenol, 3-t-butyl-4-methoxyphenol, and stearyl-β-(3,5-di-t-butyl-4-hydroxyphenyl)propionate. The use of 2,6-di-t-butyl-4-methylphenol is especially preferred.

The weight ratio (a)/(b) of the peroxyketal (a) to the monophenol-type antioxidant (b) must be from 5 to 50, and is preferably from 8 to 40, and more preferably from 10 to 35. If this value is too small, the spin rate-lowering effect on shots with a middle iron will be inadequate, as a result of which an increased distance will not be achieved. On the other hand, if this value is too large, the durability to cracking on repeated impact will worsen.

An inorganic filler may be optionally included in the above rubber composition. Examples include zinc oxide, barium sulfate, calcium carbonate and titanium oxide. The inorganic filler is included in an amount, per 100 parts by weight of the base rubber, of preferably 3 to 30 parts by weight, more preferably 5 to 25 parts by weight, and even more preferably 10 to 20 parts by weight.

It is also possible to include an organosulfur compound in the base rubber so as to confer a good rebound. Here, it is recommended that thiophenols, thionaphthols, halogenated thiophenols, or metal salts thereof be included as the organosulfur compound. Illustrative examples include pentachlorothiophenol, pentafluorothiophenol, pentabromothiophenol, p-chlorothiophenol, the zinc salt of pentachlorothiophenol, and diphenylpolysulfides, dibenzylpolysulfides, dibenzoylpolysulfides, dibenzothiazoylpolysulfides and dithiobenzoylpolysulfides having from 2 to 4 sulfurs. The use of diphenyldisulfide or the zinc salt pentachlorothiophenol is especially preferred.

The organosulfur compound may be included in an amount, per 100 parts by weight of the above base rubber, of preferably at least 0.05 part by weight, more preferably at least 0.1 part by weight, and even more preferably at least 0.15 part by weight. If too little organosulfur compound is included, a rebound improving effect cannot be expected. The upper limit in the amount of the above organosulfur compound per 100 parts by weight of the base rubber, is generally not more than 5 parts by weight, preferably not more than 3 parts by weight, and more preferably not more than 2.5 parts by weight. With the inclusion of too much organosulfur compound, a further rebound enhancing effect (especially when struck with a W#1) cannot be expected, in addition to which the core may become too soft or the feel on impact may worsen.

The solid core has a deflection, when compressed under a final load of 130 kgf from an initial load of 10 kgf, of preferably from 2.0 to 6.0 mm, more preferably from 2.5 to 5.5 mm, and even more preferably from 2.8 to 4.5 mm. If this value is too small, the feel of the ball on impact may be too hard and the contact time may be too short, resulting in a poor controllability. On the other hand, if this value is too large, the feel on impact may become too soft and the durability to cracking on repeated impact may worsen.

The core has a center hardness, expressed as the Shore D hardness, of preferably from 30 to 60, more preferably from 35 to 55, and even more preferably from 40 to 50. The core surface hardness, expressed as the Shore D hardness, is preferably from 40 to 70, more preferably from 45 to 65, and even more preferably from 50 to 60. If these values are higher than the above range, the ball may have too hard a feel when hit and the contact time may be too short, resulting in a poor controllability. On the other hand, if these values are lower than the above range, the ball may have too soft a feel and may have a poor durability to cracking on repeated impact. The value obtained by subtracting (the Shore D hardness in a portion of the core 5 mm inside the core surface) from (the Shore D hardness of the surface portion of the core) is preferably in a range of from 0 to 16, more preferably from 3 to 13, and even more preferably from 4 to 10. If this difference is too large, the surface portion of the core may be too soft, which may result in a poor durability to cracking on repeated impact.

The above solid core (hot-molded piece) may be obtained by vulcanizing and curing the above-described rubber composition by a similar method as that used for prior-art golf ball rubber compositions. Vulcanization may be carried out under conditions such as a vulcanization temperature of 100 to 200° C. and a vulcanization time of from 10 to 40 minutes. From the standpoint of obtaining the desired rubber crosslinked body for use as the core in the invention, the vulcanization temperature is preferably at least 150° C., and more preferably at least 155° C., but not more than 200° C., preferably not more than 190° C., more preferably not more than 180° C., and most preferably not more than 170° C.

In the present invention, the cover which encases the core may be formed of one layer or of two or more layers. A urethane cover is used. In urethane cover golf balls, the aromatic isocyanate component in the polyurethane is thought to form a quinoid structure under a photooxidation effect, triggering discoloration. In two-piece golf balls having a urethane cover, the antioxidant in the core composition is thought to migrate into the cover, triggering discoloration. The monophenol-type antioxidant used in the present invention has a relatively low tendency to stain (color), and thus is effective for enhancing the discoloration resistance of the urethane cover.

Alternatively, in the present invention, the above urethane cover may be made of a material molded from a resin blend composed primarily of (A) a thermoplastic polyurethane and (B) a polyisocyanate compound. By forming a cover composed primarily of such a polyurethane material, an excellent feel, controllability, cut resistance, scuff resistance and durability to cracking on repeated impact may be obtained without a loss of rebound. This cover material is described in detail below.

The above cover is composed mainly of a thermoplastic polyurethane, and is made from a resin blend in which the primary ingredients are (A) a thermoplastic polyurethane and (B) a polyisocyanate compound.

To fully achieve the objects of the invention, a necessary and sufficient amount of unreacted isocyanate groups should be present in the cover resin material. Specifically, it is recommended that the total weight of above components A and B combined be at least 60%, and preferably at least 70%, of the overall weight of the cover. Components A and B are described in detail below.

The thermoplastic polyurethane serving as component A has a structure which includes soft segments made of a polymeric polyol that is a long-chain polyol (polymeric glycol), and hard segments made of a chain extender and a polyisocyanate compound. Here, the long-chain polyol used as a starting material is not subject to any particular limitation, and may be any that is used in the prior art relating to thermoplastic polyurethanes. Exemplary long-chain polyols include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. These long-chain polyols may be used singly or as combinations of two or more thereof. Of the long-chain polyols mentioned here, polyether polyols are preferred because they enable the synthesis of thermoplastic polyurethanes having a high rebound resilience and excellent low-temperature properties.

Illustrative examples of the above polyether polyol include poly(ethylene glycol), poly(propylene glycol), poly(tetramethylene glycol) and poly(methyltetramethylene glycol) obtained by the ring-opening polymerization of cyclic ethers. The polyether polyol may be used singly or as a combination of two or more thereof. Of the above, poly(tetramethylene glycol) and/or poly(methyltetramethylene glycol) are preferred.

It is preferable for these long-chain polyols to have a number-average molecular weight in a range of 1,500 to 5,000. By using a long-chain polyol having a number-average molecular weight within this range, golf balls made with a thermoplastic polyurethane composition having excellent properties such as resilience and manufacturability can be reliably obtained. The number-average molecular weight of the long-chain polyol is more preferably in a range of 1,700 to 4,000, and even more preferably in a range of 1,900 to 3,000.

As used herein, "number-average molecular weight of the long-chain polyol" refers to the number-average molecular weight computed based on the hydroxyl number measured in accordance with JIS K-1557.

Suitable chain extenders include those used in the prior art relating to thermoplastic polyurethanes. For example, low-molecular-weight compounds which have a molecular weight of 400 or less and bear on the molecule two or more active hydrogen atoms capable of reacting with isocyanate groups are preferred. Illustrative, non-limiting, examples of the chain extender include 1,4-butylene glycol, 1,2-ethylene glycol, 1,3-butanediol, 1,6-hexanediol and 2,2-dimethyl-1,3-propanediol. Of these chain extenders, aliphatic diols having 2 to 12 carbons are preferred, and 1,4-butylene glycol is especially preferred.

The polyisocyanate compound is not subject to any particular limitation; preferred use may be made of one that is used in the prior art relating to thermoplastic polyurethanes. Specific examples include one or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. Depending on the type of isocyanate used, the crosslinking reaction during injection molding may be difficult to control. In the practice of the invention, to provide a balance between stability at the time of production and the properties that are manifested, it is most preferable to use 4,4'-diphenylmethane diisocyanate, which is an aromatic diisocyanate.

It is most preferable for the thermoplastic polyurethane serving as above component A to be a thermoplastic polyurethane synthesized using a polyether polyol as the long-chain polyol, using an aliphatic diol as the chain extender, and using an aromatic diisocyanate as the polyisocyanate compound. It is desirable, though not essential, for the polyether polyol to be a polytetramethylene glycol having a number-average molecular weight of at least 1,900, for the chain extender to be 1,4-butylene glycol, and for the aromatic diisocyanate to be 4,4'-diphenylmethane diisocyanate.

The mixing ratio of active hydrogen atoms to isocyanate groups in the above polyurethane-forming reaction can be controlled within a desirable range so as to make it possible to obtain a golf ball which is made of a thermoplastic polyurethane composition and has various improved properties, such as rebound, spin performance, scuff resistance and manufacturability. Specifically, in preparing a thermoplastic polyurethane by reacting the above long-chain polyol, polyisocyanate compound and chain extender, it is desirable to use the respective components in proportions such that the amount of isocyanate groups on the polyisocyanate compound per mole of active hydrogen atoms on the long-chain polyol and the chain extender is from 0.95 to 1.05 moles.

No particular limitation is imposed on the method of preparing the thermoplastic polyurethane used as component A. Production may be carried out by either a prepolymer process or a one-shot process in which the long-chain polyol, chain extender and polyisocyanate compound are used and a known urethane-forming reaction is effected. Of these, a process in which melt polymerization is carried out in a substantially solvent-free state is preferred. Production by continuous melt polymerization using a multiple screw extruder is especially preferred.

Illustrative examples of the thermoplastic polyurethane that may be used as component A include commercial products such as Pandex T8295, Pandex T8290, Pandex T8260, Pandex T8295 and Pandex T8290 (all available from DIC Bayer Polymer, Ltd.).

Next, concerning the polyisocyanate compound used as component B, it is essential that, in at least some portion of this compound within a single resin blend, all the isocyanate groups on the molecule remain in an unreacted state. That is, polyisocyanate compound in which all the isocyanate groups on the molecule remain in a completely free state should be present in a single resin blend, and such a polyisocyanate compound may be present together with polyisocyanate compound in which a portion of the isocyanate groups on the molecule are in a free state.

Various types of isocyanates may be employed without particular limitation as the polyisocyanate compound. Illustrative examples include one or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. Of the above group of isocyanates, the use of 4,4'-diphenylmethane diisocyanate, dicyclohexylmethane diisocyanate and isophorone diisocyanate is preferable in terms of the balance between the influence on processability of such effects as the rise in viscosity that accompanies the reaction with the thermoplastic polyurethane serving as component A and the physical properties of the resulting golf ball cover material.

In the practice of the invention, although not an essential constituent, a thermoplastic elastomer other than the above-described thermoplastic polyurethane may be included as component C together with components A and B. Including this component C in the above resin composition enables the fluidity of the resin composition to be further improved and enables improvements to be made in various properties demanded of golf ball cover materials, such as resilience and scuff resistance.

Component C, which is a thermoplastic elastomer other than the above thermoplastic polyurethane, is exemplified by one or more thermoplastic elastomer selected from among polyester elastomers, polyamide elastomers, ionomeric resins, styrene block elastomers, hydrogenated styrene-butadiene rubbers, styrene-ethylene/butylene-ethylene block copolymers and modified forms thereof, ethylene-ethylene/butylene-ethylene block copolymers and modified forms thereof, styrene-ethylene/butylene-styrene block copolymers and modified forms thereof, ABS resins, polyacetals, polyethylenes and nylon resins. The use of polyester elastomers, polyamide elastomers and polyacetals is especially preferred because the resilience and scuff resistance are enhanced, owing to reactions with isocyanate groups, while at the same time a good manufacturability is retained.

The relative proportions of above components A, B and C are not subject to any particular limitation. However, to fully achieve the objects of the invention, it is preferable for the weight ratio A:B:C of the respective components to be from 100:2:50 to 100:50:0, and more preferably from 100:2:50 to 100:30:8.

In the invention, the resin blend is prepared by mixing together component A, component B, and also component C. It is necessary to select the mixing conditions such that, of the polyisocyanate compound, at least some polyisocyanate compound is present in which all the isocyanate groups on the molecule remain in an unreacted state. For example, treatment such as mixture in an inert gas (e.g., nitrogen) or in a vacuum state must be furnished. The resin blend is then injection-molded around a core which has been placed in a mold. For easy, trouble-free handling, it is preferable that the resin blend be formed into pellets having a length of 1 to 10 mm and a diameter of 0.5 to 5 mm. Isocyanate groups in an unreacted state remain in these resin pellets; while the resin blend is being injection-molded about the core, or due to post-treatment such as annealing thereafter, the unreacted isocyanate groups react with component A or component C to form a crosslinked material.

In addition to the foregoing thermoplastic polyurethane ingredients, if necessary, various other additives may also be included in the above resin blend. For example, pigments, dispersants, antioxidants, light stabilizers, ultraviolet absorbers, and parting agents may be suitably included.

The melt mass flow rate (MFR) of the resin blend at 210° C. is not subject to any particular limitation. However, to increase the flow properties and manufacturability, the MFR is preferably at least 5 g/10 min, and more preferably at least 6 g/10 min. If the melt mass flow rate of the resin blend is too low, the flow properties will decrease, which may cause eccentricity during injection molding and may also lower the degree of freedom in the thickness of the cover that can be molded. The measured value of the melt mass flow rate is obtained in accordance with JIS K-7210 (1999 edition).

The method of molding the cover using the above material may involve feeding the above resin blend to an injection-molding machine and injecting the molten resin blend around the core. Although the molding temperature in this case will vary depending on the type of thermoplastic polyurethane, the molding temperature is generally in a range of from 150 to 250° C.

When injection molding is carried out, it is desirable though not essential to carry out molding in a low-humidity environment such as by purging with an inert gas (e.g., nitrogen) or a low-temperature gas (e.g., low dew-point dry air), or by vacuum treating, some or all places on the resin paths from the resin feed area to the mold interior. Illustrative, non-limiting, examples of the medium used for transporting the resin include low-moisture gases such as low dew-point dry air or nitrogen. By carrying out molding in such a low-humidity environment, reaction by the isocyanate groups is kept from proceeding before the resin has been charged into the mold interior. As a result, polyisocyanate in which the isocyanate groups are present in an unreacted state is included to some degree in the resin molded piece, thus making it possible to reduce variable factors such as an unwanted rise in viscosity and enabling the real crosslinking efficiency to be enhanced.

Techniques that may be used to confirm the presence of polyisocyanate compound in an unreacted state within the resin blend prior to injection molding about the core include those which involve extraction with a suitable solvent that selectively dissolves out only the polyisocyanate compound. An example of a simple and convenient method is one in which confirmation is carried out by simultaneous thermogravimetric and differential thermal analysis (TG-DTA) measurement in an inert atmosphere. For example, when the resin blend (cover material) used in the invention is heated in a nitrogen atmosphere at a temperature ramp-up rate of 10° C./min, a gradual drop in the weight of diphenylmethane diisocyanate can be observed from about 150° C. On the other hand, in a resin sample in which the reaction between the thermoplastic polyurethane material and the isocyanate mixture has been carried out to completion, a weight drop from about 150° C. is not observed, but a weight drop from about 230 to 240° C. can be observed.

After the resin blend has been molded as described above, its properties as a golf ball cover can be further improved by carrying out annealing so as to induce the crosslinking reaction to proceed further. "Annealing," as used herein, refers to aging the cover in a fixed environment for a fixed length of time.

The cover has a material hardness, expressed as the Shore D hardness, of preferably from 40 to 70, more preferably from 45 to 65, and even more preferably from 50 to 60. If the cover is too soft, on shots taken with a middle iron, as with shots taken with a W#1, the ball may take on too much spin, preventing an increased distance from being achieved. On the other hand, if the cover is too hard, the ball may not incur spin on approach shots, and thus, even for professional and highly skilled amateur golfers, may have an inadequate controllability.

The cover has a thickness of preferably from 0.8 to 2.3 mm, more preferably from 1.0 to 2.0 mm, and even more preferably from 1.3 to 1.7 mm. At a cover thickness greater than the above range, on shots taken with a middle iron, as with shots taken with a W#1, the ball may have a less than satisfactory rebound, as a result of which the desired distance may not be achieved. On the other hand, at a cover thickness below the above range, the scuff resistance may worsen and the controllability may be inadequate.

The cover in the present invention may be formed by a method known to the art, such as a method in which the cover is injection molded directly onto the core, or a method that involves initially forming two half cups in the shape of hemispherical shells, then covering the core with these cups and molding under applied pressure and heat.

In the present invention, numerous dimples are formed on the surface of the cover. The dimples arranged on the cover surface, while not subject to any particular limitation, number preferably from 250 to 350, more preferably from 300 to 350, and even more preferably from 318 to 328. If the number of dimples is higher than the above range, the ball will tend to have a low trajectory, which may shorten the distance of travel. On the other hand, if the number of dimples is too small, the ball will tend to have a high trajectory, as a result of which an increased distance may not be achieved. Any one or combination of two or more dimple shapes, including circular shapes, various polygonal shapes, dewdrop shapes and oval shapes, may be suitably used. For example, when circular dimples are used, a dimple diameter of at least about 2.5 mm but not more than about 6.0 mm may be suitably selected.

By using from three to five or more types of dimples, the dimples can be made to cover the spherical surface in a well-balanced and uniform manner. The types of dimples are not subject to any particular limitation, although the dimples may be disposed on the spherical surface in a polyhedral arrangement suitable for dimple placement, such as a repeating pattern of unit polygons (e.g., unit triangles, unit pentagons). It is also possible to use dimples which all have slightly different diameters. In such a case, the number of dimple types may be set to twenty or more. In order to fully manifest the aerodynamic properties, it is desirable for the ratio of the sum of the individual dimple surface areas, each defined as the surface area of the flat plane circumscribed by the edge of the dimple, relative to the spherical surface area of the ball were it to have no dimples thereon to be preferably at least 70%, and more preferably at least 75%.

In addition, it is preferable for at least six small dimples not larger than 3 mm to be included. The purpose is to raise the surface coverage by intermingling large and small dimples, and thereby achieve the effect of increasing the coefficient of lift CL and decreasing the coefficient of drag CD in the first half of the trajectory.

Merely decreasing the drag or the coefficient of drag CD does not by itself have much of an effect on increasing the distance traveled by the ball. In such a case, the distance at which the ball reaches the highest point on its trajectory is increased, but in the low-velocity region of the trajectory after the highest point, the ball drops due to insufficient lift, which tends to result in a loss of distance.

Therefore, it is preferable for the multi-piece solid golf ball of the invention to have a coefficient of drag CD at a Reynolds number of 180,000 and a spin rate of 2,520 rpm immediately after launch of not more than 0.225, and for the coefficient of lift CL at a Reynolds number of 70,000 and a spin rate of 2,000 rpm when the ball has been hit to retain at least 60% of the coefficient of lift CL at a Reynolds number of 80,000 and a spin rate of 2,000 rpm. The Reynolds number of 180,000 immediately after launch of the ball corresponds to a ball velocity of about 66 m/s, and Reynolds numbers of 80,000 and 70,000 correspond respectively to velocities of about 30 m/s and 26 m/s.

As described above, the golf ball of the invention has an excellent resistance to discoloration, achieves a lower spin rate and thus exhibits a good distance performance on shots with middle irons, and has an excellent feel on impact.

EXAMPLES

The following Examples and Comparative Examples are provided by way of illustration and not by way of limitation.

Examples 1 and 2, Comparative Examples 1 and 2

Core compositions formulated as shown in Table 2 were prepared, then molded and vulcanized under a vulcanization temperature and time of 155° C. and 15 minutes to produce solid cores.

Details concerning the materials used in the core formulations in Table 2 are given below.

| | |
|---|---|
| Polybutadiene: | Available under the trade name "BR 730" from JSR Corporation. |
| Peroxide (1): | Dicumyl peroxide, available under the trade name "Percumyl D" from NOF Corporation. |

-continued

| | |
|---|---|
| Peroxide (2): | A mixture of 1,1-di(t-butylperoxy)cyclohexane and silica, available under the trade name "Perhexa C-40" from NOF Corporation. |
| Antioxidant (1): | 2,6-Di-t-butyl-4-methylphenol, available under the trade name "Nocrac SP-N" from Ouchi Shinko Chemical Industry Co., Ltd. |
| Antioxidant (2): | 2,2-Methylenebis(4-methyl-6-butylphenol), available under the trade name "Nocrac NS-6" from Ouchi Shinko Chemical Industry Co., Ltd. |
| Zinc distearate: | Available under the trade name "Zinc Stearate G" from NOF Corporation. |

Next, the following cover starting materials (units: parts by weight) were worked together under a nitrogen gas atmosphere in a twin-screw extruder to give a cover resin blend.

Cover Formulation

| | |
|---|---|
| T8295 (trade name): | 100 parts by weight |
| Titanium oxide: | 3.8 parts by weight |
| Polyethylene wax: | 0.5 part by weight |
| Isocyanate compound: | 9 parts by weight |

| | |
|---|---|
| T8295 (trade name): | MDI-PTMG type thermoplastic polyurethane available under the trademark designation Pandex from DIC Bayer Polymer |
| Polyethylene wax: | Sanwax 161P, available from Sanyo Chemical Industries, Ltd. |
| Isocyanate compound: | 4,4'-Diphenylmethane diisocyanate |

Figure 2A:
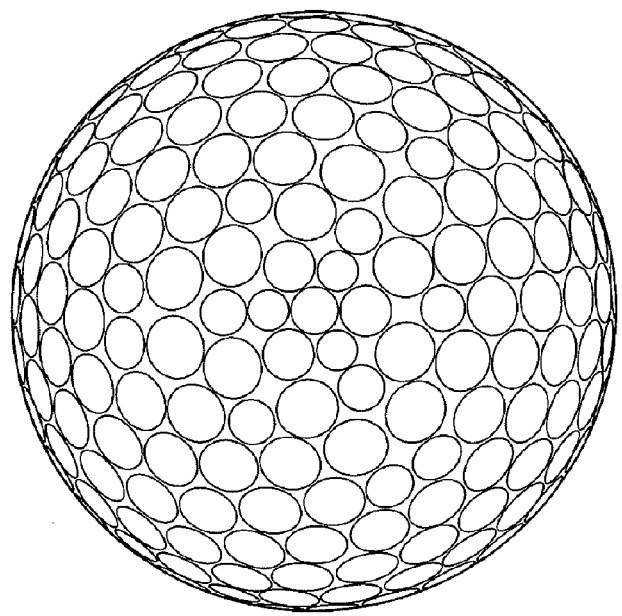
FIGS. 2A and 2B are top views of balls showing dimple patterns used in the examples of the invention.
Figure 2B:
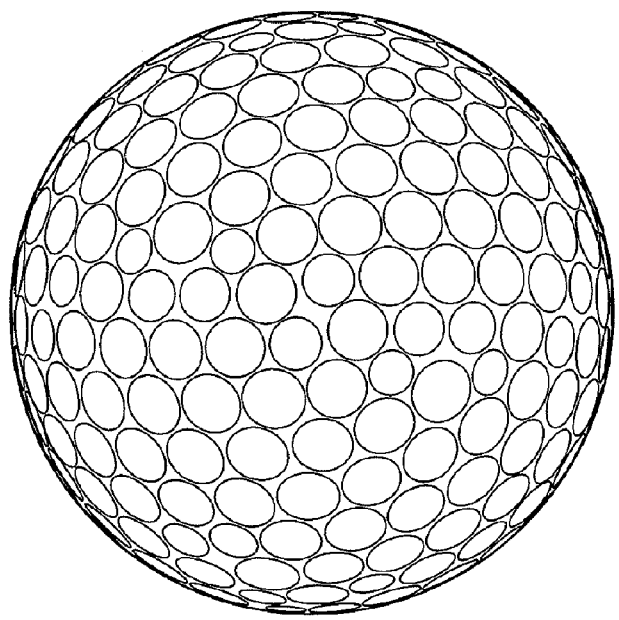

The resin blend was formed into pellets having a length of about 3 mm and a diameter of about 1 to 2 mm. This resin material was molded by an injection molding process, thereby manufacturing, as shown in FIG. 1, a golf ball G having a cover 2 formed around a core 1. Numerous dimples D were then formed on the surface of the cover 2. These dimples D had the configurations shown in FIGS. 2A and B and in Table 1 below.

TABLE 1

| No. | Number of dimples | Diameter (mm) |
|---|---|---|
| 1 | 18 | 4.7 |
| 2 | 258 | 4.5 |
| 3 | 18 | 3.7 |
| 4 | 26 | 3.4 |
| 5 | 6 | 2.9 |
| Types of dimples | 5 types | |
| Number of dimples | 326 dimples | |
| SR | 80% | |
| Low-velocity CL ratio | 82% | |

The following methods were used to measure the physical properties of the golf balls manufactured by the above procedure and to rate their performance such as flight. The results are given in Table 2.

Deflection of Core and Finished Product

Using a model 4204 test system manufactured by Instron Corporation, the solid cores and the finished products were each compressed at a rate of 10 mm/min, and the difference between the deflection under a load of 10 kg and the deflection under a load of 130 kg was measured.

Core Hardness Profile (Shore D Hardness)

The Shore D hardnesses (ASTM-2240 standard, durometer type D) were measured at different places after temperature conditioning at 23° C.

The surface hardness is the average of the values measured at two randomly selected points on the surface of each of five cores.

The center hardness is the average of the hardnesses at the center portion of the cross-section of the two hemispheres obtained from each of five cores that were cut in half with a fine cutter.

The cross-sectional hardness was obtained by cutting a core in half, then measuring the hardnesses at a position 5 mm from the center of the cross-section and at a position 5 mm inside the surface. The values shown are the average hardnesses at these positions in the cross-sections of the two hemispheres obtained for each of five cores.

Cover Hardness (Shore D Hardness)

The Shore D hardness of the cover is the value measured in accordance with ASTM D-2240 for a 6 mm thick sheet of the injection-molded cover material.

Feel

The feel of each ball when teed up and shot with a driver at a head speed of 40 m/s and when hit with a putter was evaluated by ten amateur golfers, and was rated as indicated below based on the number of golfers who responded that the ball had a "soft" feel. The driver used was an X-DRIVE 701 (loft angle, 10°), and the putter was a Tour Stage ViQ Model-III. Both clubs are manufactured by Bridgestone Sports Co., Ltd.

| | |
|---|---|
| NG: | 1 to 3 golfers rated the ball as "soft." |
| Ordinary: | 4 to 6 golfers rated the ball as "soft." |
| Good: | 7 to 10 golfers rated the ball as "soft." |

Distance with a Driver (W#1)

The distance traveled by the ball when shot at a head speed (HS) of 45 m/s with an W#1 mounted on a golf swing robot was measured. The club used was a TourStage X-Drive 701 (loft angle, 9°) manufactured by Bridgestone Sports Co., Ltd.

| | |
|---|---|
| Good: | Total distance was 230 m or more. |
| NG: | Total distance was less than 230 m. |

Distance with a Middle Iron (I#6)

The distance traveled by the ball when hit at a head speed (HS) of 40 m/s with a I#6 mounted on a golf swing robot was measured. The club used was a TourStage X-BLADE CB (#6) manufactured by Bridgestone Sports Co., Ltd.

| | |
|---|---|
| Good: | Total distance was 163 m or more. |
| NG: | Total distance was less than 163 m. |

Discoloration Resistance

The difference ΔE in the surface hue of the ball before and after 48 hours of standing outdoors was measured, and the discoloration resistance was rated according to the following criteria. A multiple light source spectrocolorimeter manufactured by Suga Test Instruments Co., Ltd. was used to measure the color tone.

| Good: | less than 10 |
|---|---|
| NG: | 10 or more |

TABLE 2

| | | Example | | Comparative Example | |
|---|---|---|---|---|---|
| | | 1 | 2 | 1 | 2 |
| Core formulation (pbw) | Polybutadiene | 100 | 100 | 100 | 100 |
| | Zinc diacrylate | 29 | 27 | 27 | 29 |
| | Peroxide (1) | 0 | 0 | 0 | 0.3 |
| | Peroxide (2) (a) | 3 | 1.5 | 3 | 0.3 |
| | Antioxidant (1) (b) | 0.1 | 0.1 | | 0.1 |
| | Antioxidant (2) | | | 0.1 | |
| | Zinc oxide | 13.1 | 14.5 | 14.0 | 14.0 |
| | Organosulfur compound | 0.2 | 0.2 | 0.2 | 0.2 |
| | Zinc distearate | 5.0 | 5.0 | 5.0 | 5.0 |
| | (a)/(b) | 30 | 15 | — | 3 |
| Core properties | Diameter (mm) | 39.3 | 39.3 | 39.3 | 39.3 |
| | Deflection (mm) | 3.0 | 3.5 | 3.1 | 3.0 |
| | Hardness Shore D hardness at center | 47 | 41 | 45 | 43.7 |
| | Shore D hardness 5 mm inside center | 53 | 51 | 52 | 54.5 |
| | Shore D hardness at surface | 59 | 55 | 58 | 54.8 |
| | (surface) - (5 mm inside surface) | 6 | 4 | 6 | 0.3 |
| Cover | Shore D hardness of sheet | 57 | 57 | 57 | 57 |
| | Specific gravity | 1.15 | 1.15 | 1.15 | 1.15 |
| | Thickness (mm) | 1.7 | 1.7 | 1.7 | 1.7 |
| Deflection of ball (mm) | | 2.7 | 3.1 | 2.8 | 2.9 |
| Number of dimples | | 326 | 326 | 326 | 326 |
| Aerodynamic properties: low-velocity CL ratio (%) | | 82 | 82 | 82 | 82 |
| Dimple surface area ratio (SR) (%) | | 80 | 80 | 80 | 80 |
| Feel | Driver | Good | Good | Good | Good |
| | Putter | Good | Good | Good | Good |
| W#1 driver | Spin rate (rpm) | 2716 | 2720 | 2823 | 2823 |
| | Carry (m) | 219 | 220 | 222 | 222 |
| | Distance (m) | 233 | 234 | 234 | 234 |
| | Rating | Good | Good | Good | Good |
| Middle iron (I#6) | Spin rate (rpm) | 6223 | 5816 | 6292 | 6581 |
| | Distance (m) | 164 | 167 | 165 | 158 |
| | Rating | Good | Good | Good | NG |
| Discoloration resistance of ball | ΔEh | 5 | 5 | 14 | 5 |
| | Rating | Good | Good | NG | Good |

From the results in Table 2, the golf balls in the comparative examples had the following drawbacks.

In Comparative Example 1, the antioxidant is not a monophenol-type antioxidant; the ball has a poor discoloration resistance.

In Comparative Example 2, the ratio of peroxyketal and antioxidant is smaller than the specified range; the spin rate increases on shots with a middle iron (I#6), resulting in a poor distance.

The invention claimed is:

1. A golf ball comprising a core formed by vulcanizing a rubber composition and a cover composed primarily of a polyurethane material, wherein the rubber composition of the core includes 100 parts by weight of a base rubber, from 10 to 40 parts by weight of an unsaturated carboxylic acid or a metal salt thereof, a peroxyketal (a) and a monophenol-type antioxidant (b), the weight ratio (a)/(b) of the peroxyketal to the monophenol-type antioxidant being from 5 to 50, wherein the peroxyketal is included in an amount of from 1.0 to 4 parts by weight per 100 parts by weight of the base rubber.

2. The golf ball of claim 1, wherein the peroxyketal is 1,1-bis(t-butylperoxy)cyclohexane and is included in an amount of from 1.5 to 3.0 parts by weight per 100 parts by weight of the base rubber.

3. The golf ball of claim 1, wherein the monophenol-type antioxidant is 2,6-di-t-butyl-4-methylphenol and is included in an amount of from 0.1 to 0.2 part by weight per 100 parts by weight of the base rubber.

4. The golf ball of claim 1, wherein the polyurethane material of the cover is a material formed by injection-molding a single resin blend composed primarily of (A) a thermoplastic polyurethane and (B) a polyisocyanate compound, in at least some portion of the polyisocyanate compound all the isocyanate groups on the molecule remain in an unreacted state.

5. The golf ball of claim 1, wherein the core has a deflection when compressed under a final load of 130 kgf from an initial load of 10 kgf of from 2.0 to 6.0 mm, and the ball has a deflection when compressed under a final load of 130 kgf from an initial load of 10 kgf of from 2.2 to 5.0 mm.

6. The golf ball of claim 1, wherein the ball has from 250 to 350 dimples formed on a surface thereof, which dimples are of at least five types, include from 6 to 30 small-diameter dimples with a diameter of not more than 3.0 mm, and have a dimple surface coverage (SR), defined as the sum of the surface areas on a hypothetical sphere that are circumscribed by the edges of the respective dimples as a proportion of the surface area of the hypothetical sphere, of at least 70%; and the ball, when struck, has a coefficient of lift CL at a Reynolds number of 70,000 and a spin ratio of 2,000 rpm which is at least 60% of the coefficient of lift CL at a Reynolds number of 80,000 and a spin rate of 2,000 rpm.

7. The golf ball of claim 1, wherein the weight ratio (a)/(b) of the peroxyketal to the monophenol-type antioxidant is from 15 to 50.

8. The golf ball of claim 2, wherein the base rubber comprises at least 60% by weight of polybutadiene.

9. The golf ball of claim 3, wherein the base rubber comprises at least 60% by weight of polybutadiene.

* * * * *